(12) United States Patent
Watanabe

(10) Patent No.: US 6,776,063 B2
(45) Date of Patent: Aug. 17, 2004

(54) BALL SCREW

(75) Inventor: Yasumi Watanabe, Gunma (JP)

(73) Assignee: NSK Ltd., Tokyo (JP)

( * ) Notice: Subject to any disclaimer, the term of this patent is extended or adjusted under 35 U.S.C. 154(b) by 41 days.

(21) Appl. No.: 10/196,374

(22) Filed: Jul. 17, 2002

(65) Prior Publication Data

US 2003/0015053 A1 Jan. 23, 2003

(30) Foreign Application Priority Data

Jul. 17, 2001 (JP) .................................... P. 2001-217162
Dec. 18, 2001 (JP) .................................... P. 2001-385046

(51) Int. Cl.[7] .......................... F16H 1/18; F16C 29/06; F16C 29/04
(52) U.S. Cl. .............................. 74/424.86; 74/424.71; 74/424.81; 384/43; 384/49
(58) Field of Search ........................ 74/424.71, 424.72, 74/424.75, 424.81, 424.82, 424.83, 424.84, 424.85, 424.86, 424.87, 424.88, 424.7; 384/50, 51, 52, 53, 54, 55, 56, 43, 49

(56) References Cited

U.S. PATENT DOCUMENTS

| | | | | |
|---|---|---|---|---|
| 2,890,594 A | * | 6/1959 | Galonska | 74/424.82 |
| 3,498,153 A | * | 3/1970 | Wagner | 74/499 |
| 4,074,587 A | * | 2/1978 | Brusasco | 74/424.82 |
| 4,304,443 A | * | 12/1981 | Hoffmann | 384/45 |
| 4,474,073 A | * | 10/1984 | Blaurock et al. | 74/424.82 |
| 4,750,378 A | * | 6/1988 | Sheppard | 74/424.87 |
| 5,063,809 A | * | 11/1991 | Schlenker | 74/424.86 |
| 5,094,119 A | * | 3/1992 | Virga et al. | 74/89.42 |
| 5,467,662 A | * | 11/1995 | Lange et al. | 74/424.83 |
| 6,089,117 A | * | 7/2000 | Ebina et al. | 74/424.87 |
| 2003/0172759 A1 | * | 9/2003 | Hayashi | 74/424.86 |

* cited by examiner

Primary Examiner—David A. Bucci
Assistant Examiner—Colby Hansen
(74) Attorney, Agent, or Firm—Sughrue Mion, PLLC

(57) ABSTRACT

In the ball screw, a ball circulation tube 20 is formed to have such a shape that the movable amount of balls 15 in a first direction (X) intersecting at right angles to the axis of the tube 20 is larger than the movable amount of the balls 15 in a second direction (Y) intersecting at right angles to the first direction (X), and the ball circulation tube 20 is fixed to a nut 13 in such a manner that the outer surface 20a of the tube 20 extending in parallel with the first direction (X) is opposed to the outer surface of the nut 13. Accordingly, it is possible to provide a ball screw which can restrict variations in the torque of the ball screw caused by the mutual sliding movements of balls occurring within a ball circulation tube.

9 Claims, 14 Drawing Sheets

BALL SCREW

BACKGROUND OF THE INVENTION

The present invention relates to a ball screw for use in a machine tool and, especially, to a ball screw of a tube circulation type.

In a machine tool, as a mechanism for converting the rotation of a motor into a linear motion, there is used, for example, such a ball screw 10 as shown in FIGS. 21 and 22. This ball screw 10 is structured in the following manner. Namely, a screw shaft 11 includes a first spiral groove 12 formed in the outer peripheral surface thereof. In the inner peripheral surface of a nut 13 disposed on the outer periphery of the screw shaft 11, there is formed a second spiral groove 14 such that it is opposed to the first spiral groove 12. Also, in the ball screw 10, between the first and second spiral grooves 12 and 14, there are interposed a large number of balls 15 in such a manner that they are allowed to roll between them. In case where the screw shaft 11 is rotated, the balls 15 are allowed to roll between the first and second spiral grooves 12 and 14 due to a frictional force and, with the rolling motion of the balls 15, the nut 13 is allowed to move in the axial direction of the screw shaft 11.

By the way, to make the nut 13 of the ball screw 10 move continuously in the axial direction of the screw shaft 11, the balls 15 must be rolled repeatedly between the first and second spiral grooves 12 and 14. For this purpose, conventionally, there are formed, in the nut 13, ball circulation holes 16 and 17 which are used to discharge the balls 15 from a rolling passage formed between the first and second spiral grooves 12 and 14 to the outside of the nut 13 or introduce the balls 15 into the rolling passage from the outside of the nut 13, and, the two end portions of a ball circulation tube 18 are respectively inserted into these ball circulation holes 16 and 17 to thereby roll the balls 15 repeatedly. By the way, in FIGS. 21 and 22, reference character 19 designates a mounting metal member which is used to mount the ball circulation tube 18 onto the nut 13.

However, in the above-mentioned conventional ball screw, as a ball circulation tube which forms a circulation passage for the balls 15 in the outside of the nut 13, there is used such a ball circulation tube as shown in FIG. 23, that is, the ball circulation tube 18 whose section along the diameter direction thereof has a shape approximate to a circle and, therefore, as shown in FIG. 24, in the curved portions of the ball circulation tube 18, the balls 15 are arranged in a line on the outside thereof. In the case of such ball arrangement, as shown in FIG. 25, due to the mutual sliding motion between the balls which occurs within the ball circulation tube 18, the torque of the ball screw is caused vary, which has an ill influence on the operating performance of the ball screw.

SUMMARY OF THE INVENTION

The present invention aims at eliminating the drawbacks found in the conventional ball screw. Accordingly, it is an object of the invention to provide a ball screw which can prevent the torque to the ball screw from varying greatly due to the mutual sliding motion between the balls which occurs within the ball circulation tube.

The above object can be attained by a ball screw according to a first aspect of the present invention, comprising:

a screw shaft including a first spiral groove formed in the outer peripheral surface thereof;

a nut disposed on the outer periphery of the screw shaft, said nut having a second spiral groove formed in its inner peripheral surface in such a manner that it is opposed to the first spiral groove;

a number of balls rollably held by and between the second spiral groove and first spiral groove; and, a ball circulation tube for forming a circulation passage for the balls in the outside of the nut, wherein the ball circulation tube has such a shape that the movable amount of the balls in a first direction intersecting at right angles to the axis of the ball circulation tube is larger than the movable amount of the balls in a second direction intersecting at right angles to the first direction, and the ball circulation tube is fixed to the nut in such a manner that the outer surface of the ball circulation tube extending in parallel with the first direction is opposed to the outer surface of the nut.

Further, the above-mentioned object of a second aspect of the present invention would be invention, in a ball screw as set forth in the first aspect of the present invention, in a ball line formed by the large number of balls, there are inserted a plurality of spacers each having a modulus of longitudinal elasticity smaller than the modulus of longitudinal elasticity of each of the balls.

According to a third aspect of the invention, in a ball screw as set forth in the first or second aspect of the invention, the balls are respectively made of steel material and the spacers are respectively made of resin.

According to a fourth aspect of the invention, in a ball screw as set forth in the second or third aspect of the invention, the spacer is formed in a spherical shape almost identical in size with the ball.

According to a fifth aspect of the invention, in a ball screw as set forth in the second or third aspect of the invention, each of the spacers is formed in a disk-like shape having a diameter smaller than the diameter of each of the balls and also includes two concavely spherical surfaces respectively formed in the two end portions thereof that are opposed to the balls, while each of the concavely spherical surfaces has a radius of curvature larger than the radius of each of the balls.

According to a sixth aspect of the invention, in a ball screw as set forth in any one of the second to fifth aspects, the spacers are respectively interposed between the balls.

According to a seventh aspect of the invention, there is provided a ball screw, comprising: a screw shaft including a first spiral groove formed in the outer peripheral surface thereof; a nut disposed on the outer periphery of the screw shaft; a second spiral groove formed in the inner peripheral surface of the nut in such a manner that it is opposed to the first spiral groove: a large number of balls rollably held by and between the second spiral groove and first spiral groove; and, a ball circulation tube for forming a circulation passage for the balls in the outside of the nut, wherein, in a ball line formed by the large number of balls, there are inserted a plurality of spacers each having a modulus of longitudinal elasticity smaller than the modulus of longitudinal elasticity of each of the balls.

In a ball screw according to the first aspect of the invention, since the balls roll within the ball circulation tube in such a manner that they are arranged in a zigzag manner, variations in the torque of the ball screw caused by the mutual sliding movements of the balls occurring within the ball circulation tube can be restricted.

According to the second to seventh aspects of the invention, in case where the number of balls existing within the ball circulation tube increases and a so called ball packed phenomenon is thereby caused to occur within the ball circulation tube, the spacers are elastically deformed in the arrangement direction of the balls according to the ball packed amount (the varying amount of the number of balls existing within the ball circulation tube) and thus the ball packed amount can be absorbed by the spacers. This can restrict the variations in the torque of the ball screw which are caused by the ball packed phenomenon.

Also, according to the fourth aspect of the invention, since the balls are prevented from colliding with each other, there can be prevented generation of noises which would otherwise occur due to the mutual collision between the balls.

DETAILED DESCRIPTION OF THE PREFERRED EMBODIMENTS

Figure 21:
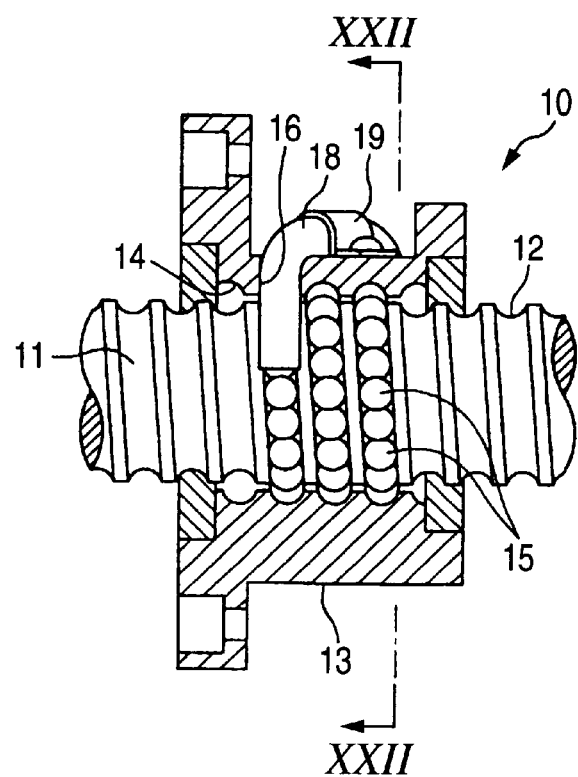
FIG. 21 is a section view of a conventional ball screw.
Figure 22:
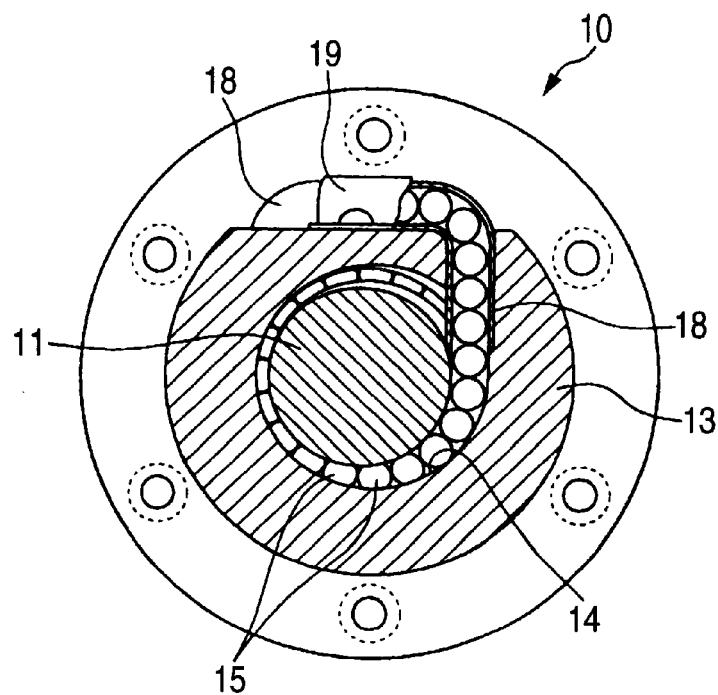
FIG. 22 is a section view taken along the arrow lines XXII—XXII shown in FIG. 21.
Figure 23:
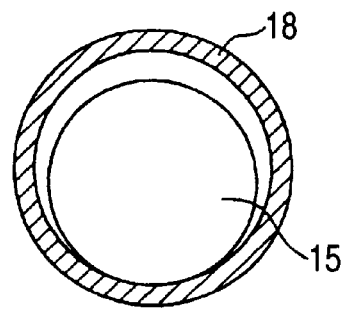
FIG. 23 is a section view of a ball circulation tube shown in FIG. 21.
Figure 24A:
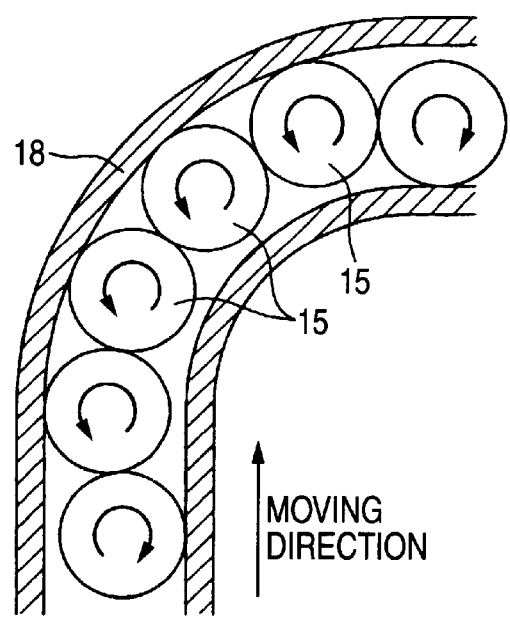
FIGS. 24A and 24B show different cross sections as to how balls are arranged in the curved portions of a ball circulation tube shown in FIG. 21; and, FIG. 25 is a graphical representation of variations in the torque of the conventional ball screw shown in FIG. 21.
Figure 24B:
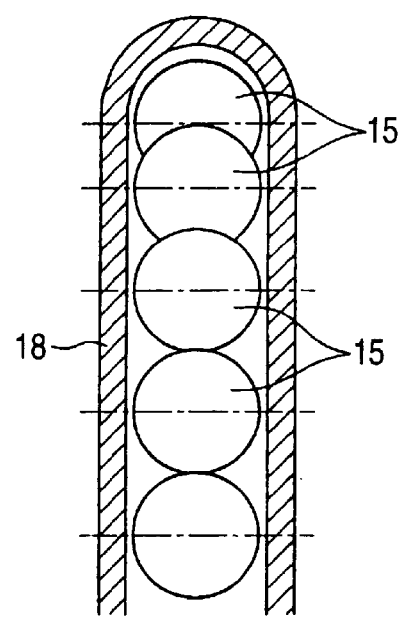
Figure 25:
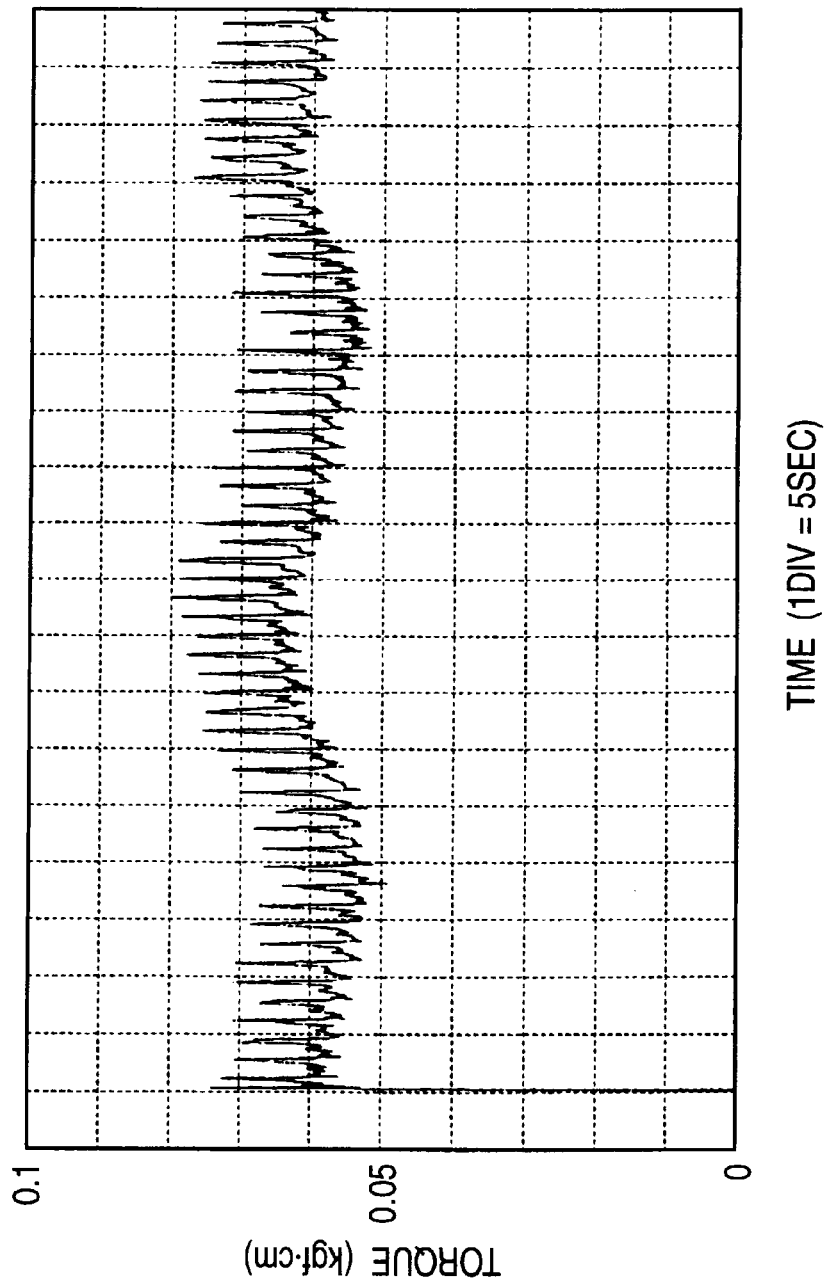

Now, description will be given below of the preferred embodiments of a ball screw according to the invention with reference to the accompanying drawings. By the way, the same parts of the embodiments of the invention as those of the conventional ball screw previously described with reference to FIGS. 21 and 22 are given the same designations and thus the detailed description thereof is omitted here.

Figure 1:
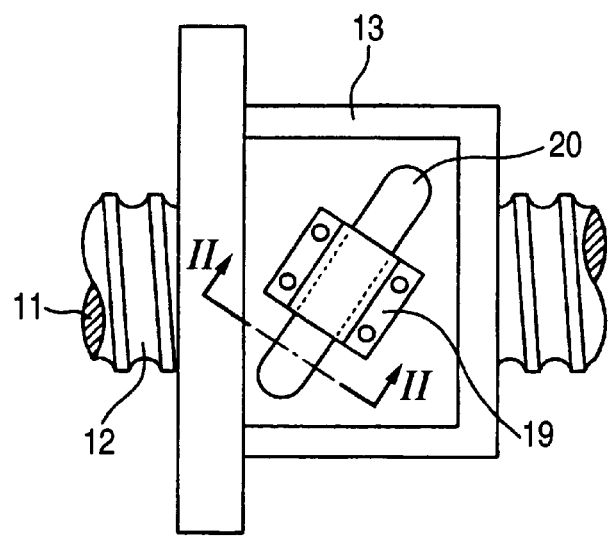
FIG. 1 is a plan view of a ball screw according to a first embodiment of the invention.
Figure 2:
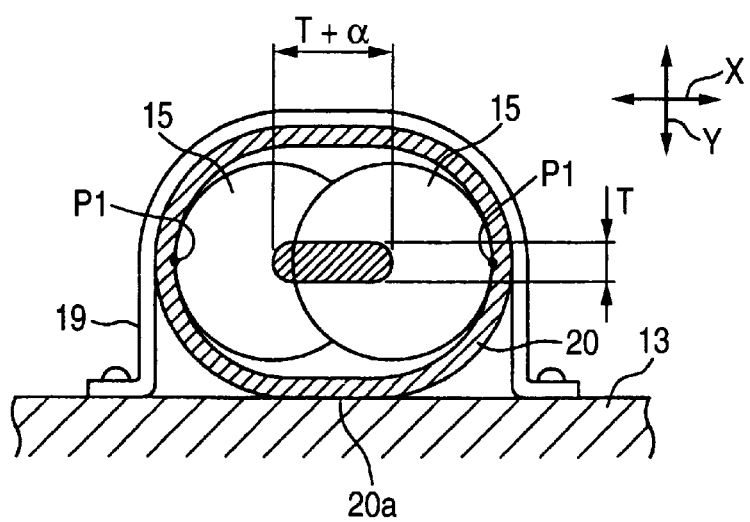
FIG. 2 is a section view taken along the arrow lines II—II shown in FIG. 1.

FIG. 1 shows a plan view of a ball screw according to a first embodiment of the invention, while FIG. 2 shows a section view taken along the arrow lines II—II shown in FIG. 1. In FIG. 1, reference character 20 designates a ball circulation tube which forms a ball circulation passage in the outside of a nut 13. This ball circulation tube 20 is structured such that, as shown in FIG. 2, its section along the diameter direction thereof has an oval shape having opposed straight lines.

Also, the ball circulation tube 20 is further structured as follows: that is, the movable amount (T+α) of the ball 15 in a first direction (in FIG. 2 in the X direction) where the section along the diameter direction thereof intersects at right angles to the axis of the ball circulation tube 20 is larger than the movable amount (T) of the ball 15 in a second direction (in FIG. 2, in the Y direction) which intersects at right angles to the first direction. And, the ball circulation tube 20 is fixed to the nut 13 in such a manner that its outer surface 20a extending perpendicularly with respect to the first direction (in FIG. 2, the X direction) is opposed to the outer surface of the nut 13. In other words, the ball circulation tube 20 is formed to have such a shape that allows the balls 15 to be arranged in a zigzag manner within the ball circulation tube 20.

Figure 3:
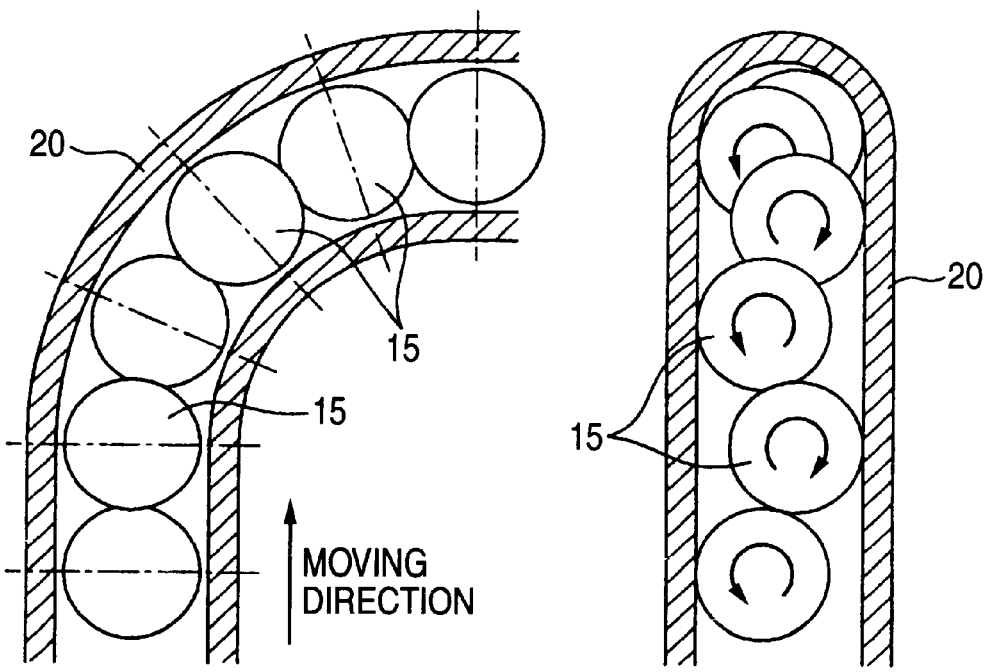
FIGS. 3A and 3B show different cross sections as to how balls are arranged in the curved portions of a ball circulation tube shown in FIG. 1.

In this manner, in case where not only the ball circulation tube 20 has such a shape that the movable amount of the ball 15 in the first direction (in FIG. 2, in the X direction) where the section along the diameter direction thereof intersects at right angles to the axis of the ball circulation tube 20 is larger than the movable amount of the ball 15 in the second direction (in FIG. 2, in the Y direction) which intersects at right angles to the first direction, but also the ball circulation tube 20 is fixed to the nut 13 in such a manner that the outer surface 20a disposed in a direction (the second direction) perpendicular to the first direction (that is, the outer surface 20a that extends in parallel with the first direction) is confronted with to the outer surface of the nut 13, as shown in FIG. 3, the balls 15 are arranged in a zigzag manner within the ball circulation tube 20. Due to this, the balls 15 are allowed to roll together, which makes it difficult for the mutual sliding motion between the balls 15 to occur within the ball circulation tube 20. This can prevent the torque of the present ball screw from varying greatly due to the mutual sliding motion between the balls 15 that can otherwise occur within the ball circulation tube 20.

Figure 4:
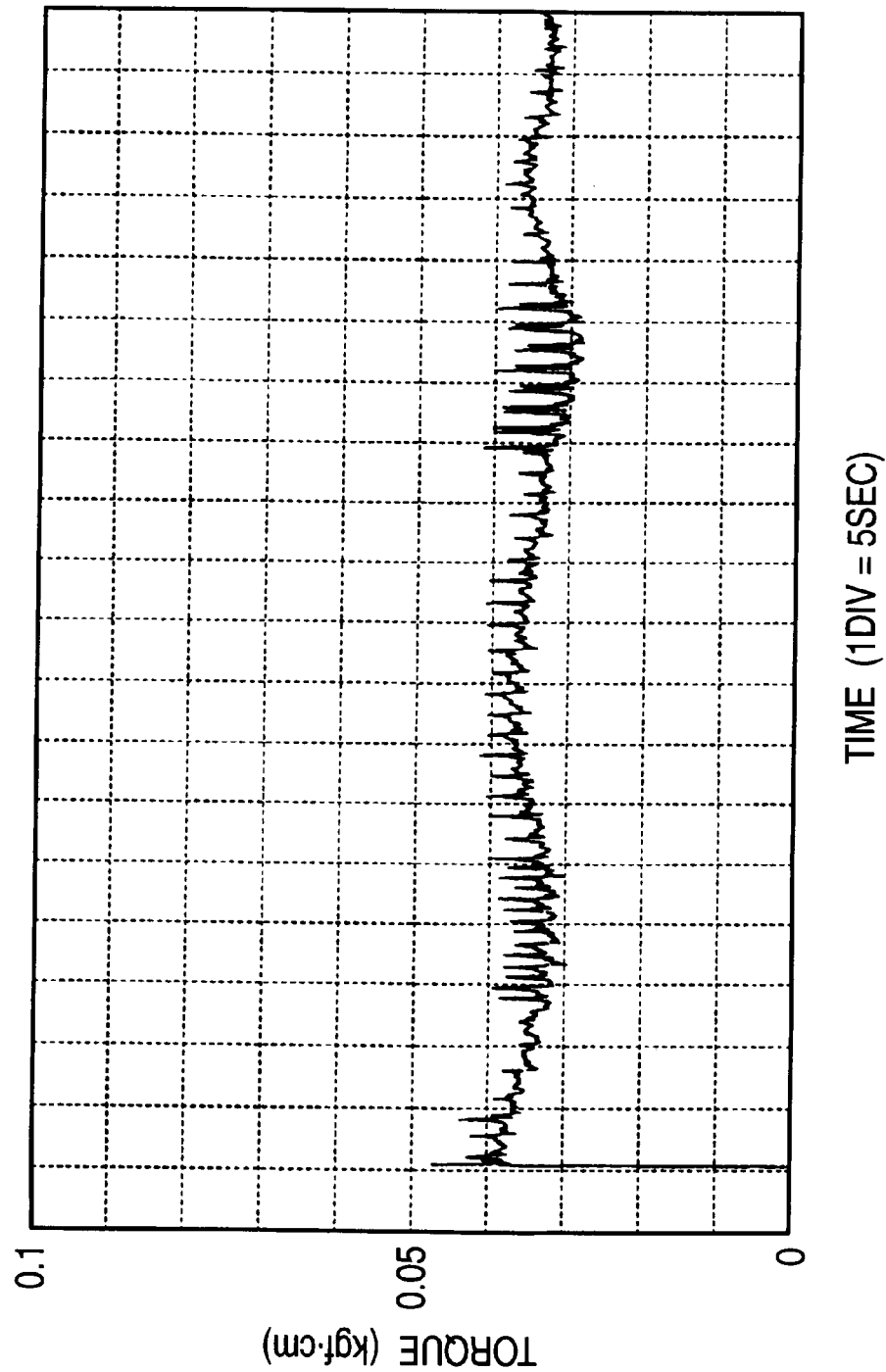
FIG. 4 is a graphical representation of variations in the torque of the ball screw shown in FIG. 1.
Figure 5:
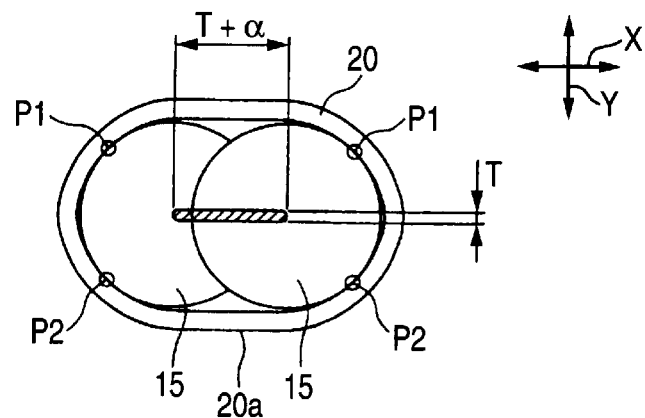
FIG. 5 is a section view of a ball circulation tube for explanation of a ball screw according to a second embodiment of the invention.
Figure 6:
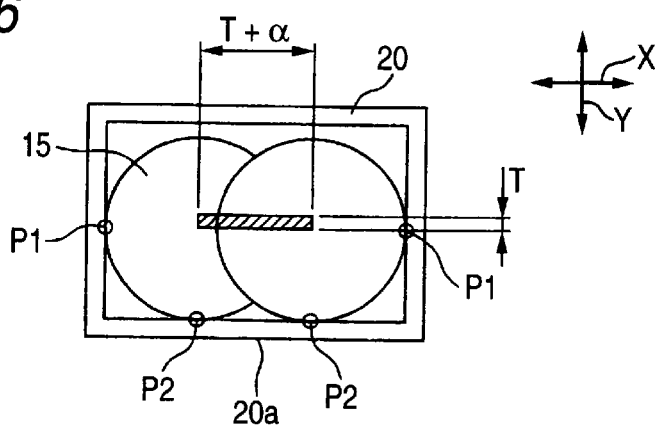
FIG. 6 is a section view of a ball circulation tube for explanation of a ball screw according to a third embodiment of the invention.
Figure 7:
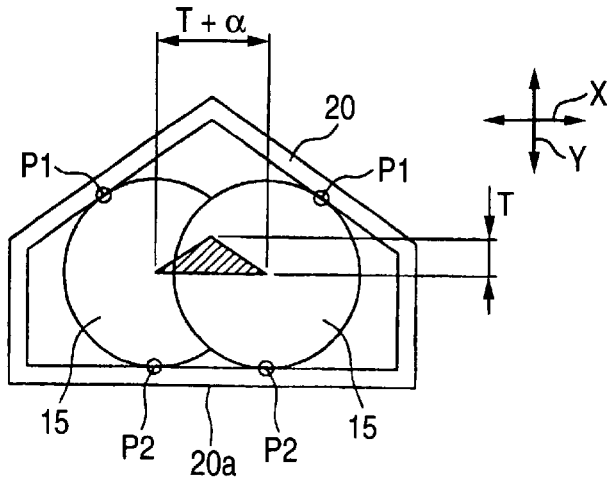
FIG. 7 is a section view of a ball circulation tube for explanation of a ball screw according to a fourth embodiment of the invention.
Figure 8:
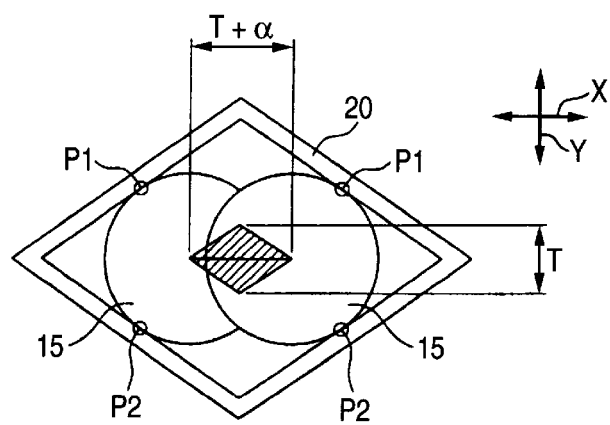
FIG. 8 is a section view of a ball circulation tube for explanation of a ball screw according to a fifth embodiment of the invention.

Now, FIG. 4 shows the results that are obtained when variations in the torque of the ball screw shown in FIG. 1 are measured. As can be clearly seen from FIG. 4 as well, in case where not only the ball circulation tube 20 has such a shape that the movable amount of the ball 15 in the first direction where the section along the diameter direction thereof intersects at right angles to the axis of the ball circulation tube 20 is larger than the movable amount of the ball 15 in the second direction which intersects at right angles to the first direction, but also the ball circulation tube 20 is fixed to the nut 13 in such a manner that the outer surface 20a extending perpendicularly with respect to the first direction is opposed to the outer surface of the nut 13, the torque of the ball screw can be prevented from varying greatly.

By the way, the invention is not limited to above-mentioned first embodiment. For example, although, in the first embodiment, the section of the ball circulation tube 20 along the diameter direction thereof is formed to have an oval shape having opposed straight lines, as in the second to fifth embodiments of the invention which are respectively shown in FIGS. 5 to 8, the section of the ball circulation tube 20 along the diameter direction thereof may also be formed to have a Gothic-arc shape, a rectangular shape, a triangular shape, or a diamond-like shape. Also, according to the first embodiment, the ball 15 is contacted with the inner surface of the ball circulation tube 20 at a point P1; but, as in the respective embodiments shown in FIGS. 5 to 8, the ball 15 may also be contacted with the inner surface of the ball circulation tube 20 at two points, that is, point P1 and point P2.

Figure 9:
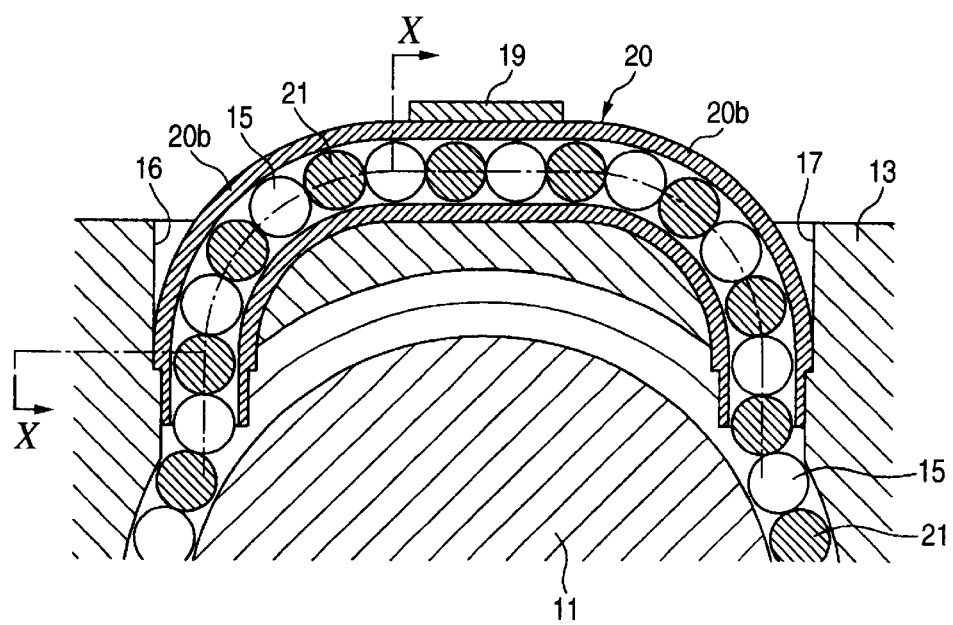
FIG. 9 is a section view of the main portions of a ball screw according to a sixth embodiment of the invention.
Figure 10:
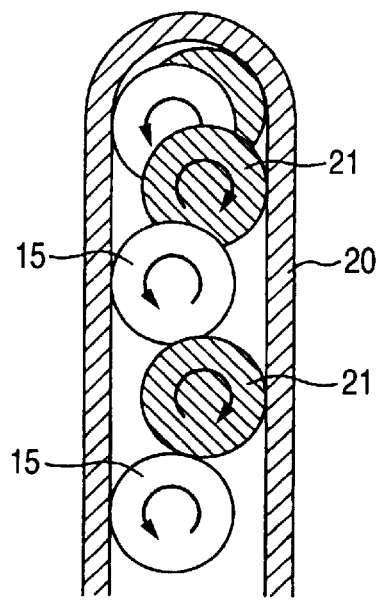
FIG. 10 is a section view taken along the arrow lines X—X shown in FIG. 9.
Figure 11:
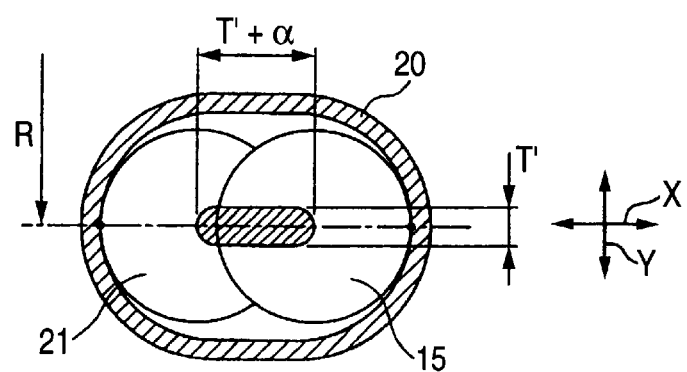
FIG. 11 is a transverse section view of a ball circulation tube shown in FIG. 9.

Now, FIGS. 9 to 11 respectively show a ball screw according to a sixth embodiment of the invention. Specifically, FIG. 9 shows a section view of the main portions of a ball screw according to the sixth embodiment, FIG. 10 shows a section view taken along the arrow lines X–X shown in FIG. 9, and FIG. 11 shows a transverse section view of a ball circulation tube shown in FIG. 9.

As shown in FIG. 9, a nut 13, which is employed in the ball screw according to the sixth embodiment, includes ball circulation holes 16 and 17; and, into these ball circulation holes 16 and 17, there are inserted the two end portions of a ball circulation tube 20. This ball circulation tube 20 is a tube which is used to form a circulation passage for the balls 15 in the outside of the nut 13 and is made of metal. Also, the ball circulation tube 20 is formed substantially in a U shape and the cross section thereof, as shown in FIG. 11, is formed to have such a shape (for example, an oval shape having opposed straight lines) that the movable amount (T+α) of the ball 15 in a first direction (in FIG. 11, in the X direction) where the section along the diameter direction thereof intersects at right angles to the axis of the ball circulation tube 20 is larger than the movable amount (T) of the ball 15 in a second direction (in FIG. 11, in the Y direction) which intersects at right angles to the first direction; that is, the cross section of the ball circulation tube 20 is formed to have such a shape that the balls 15 can be arranged in a line along the curved portion 20b of the ball circulation tube 20 within the ball circulation tube 20 and in a zigzag manner with respect to the advancing direction of the balls 15.

The balls 15 are respectively made of hard material such as steel material and, in the ball line formed by these balls 15, there are interposed a plurality of spacers 21. These spacers 21 are respectively made of soft material such as synthetic resin and the modulus of longitudinal elasticity of each of the spacers 21 is set at a value smaller than the modulus of longitudinal elasticity of each of the balls 15, specifically, the modulus of longitudinal elasticity of the spacer 21 is of the order of 1/50–1/500 of the modulus of longitudinal elasticity of the ball 15. Also, each of the spacers 21 has a spherical shape almost identical in size with the ball 15 or smaller in size by 10 μm–100 μm than the ball 15. In the present embodiment, the spacers 21 are respectively interposed between the mutually adjoining balls 15.

Next, description will be given below of the operation of a ball screw according to the sixth embodiment with reference to FIGS. 12–15.

Figure 12:
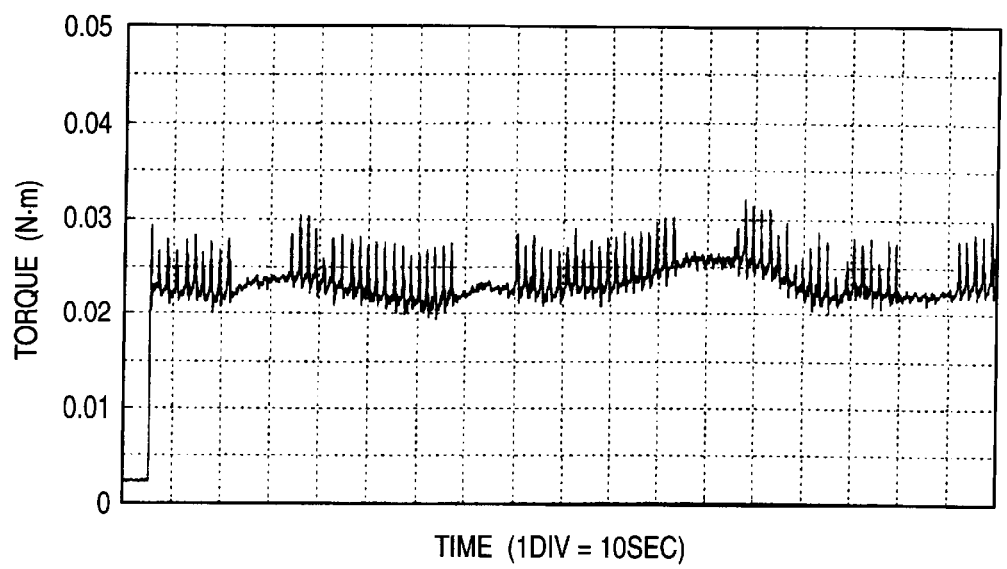
FIG. 12 is a graphical representation of variations in the torque of a conventional ball screw.
Figure 13:
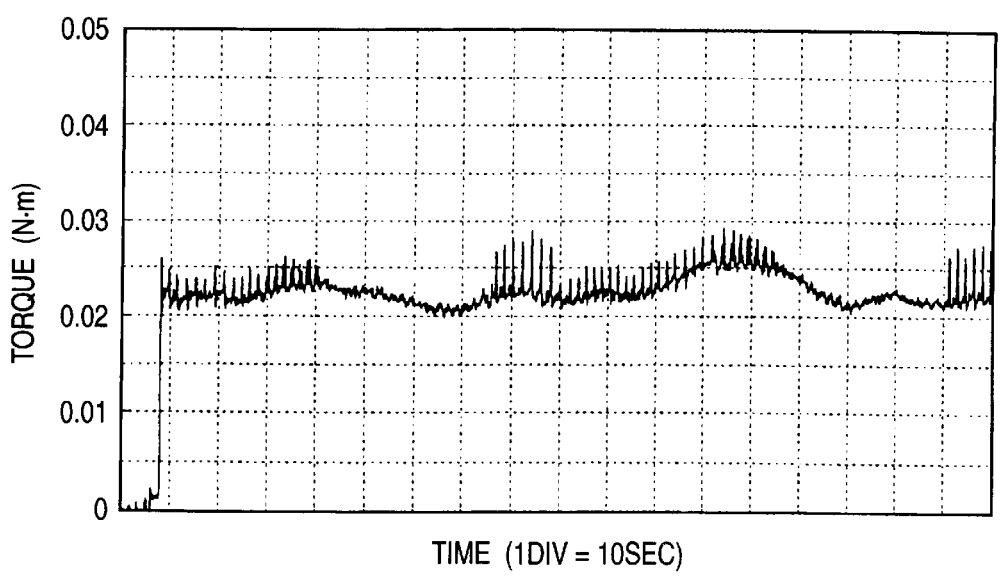
FIG. 13 is a graphical representation of variations in the torque of a ball screw comprising a ball circulation tube having an oval-shaped cross section.
Figure 14:
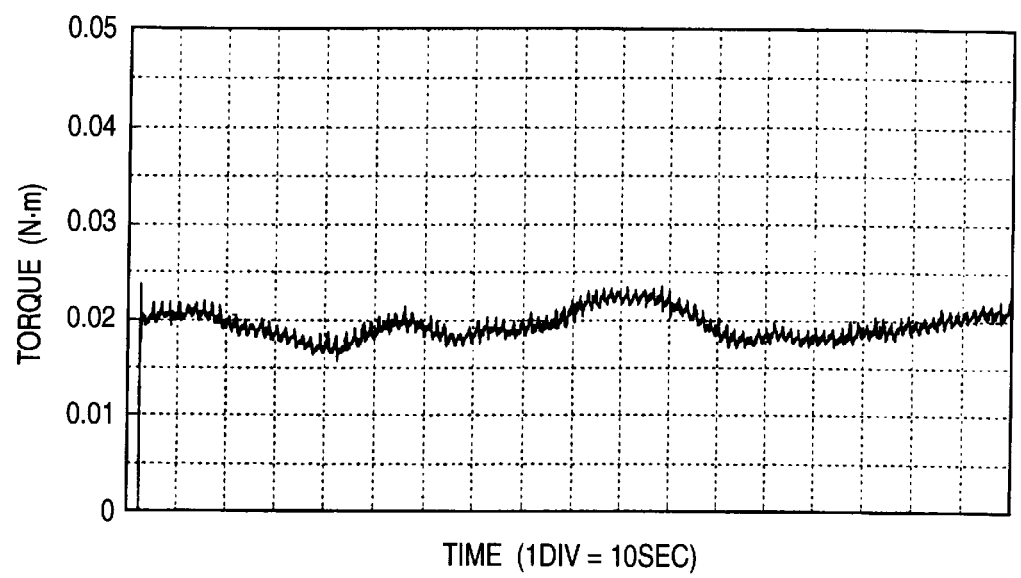
FIG. 14 is a graphical representation of variations in the torque of a ball screw in which resin-made spherical-shaped spacers are respectively interposed between balls.
Figure 15:
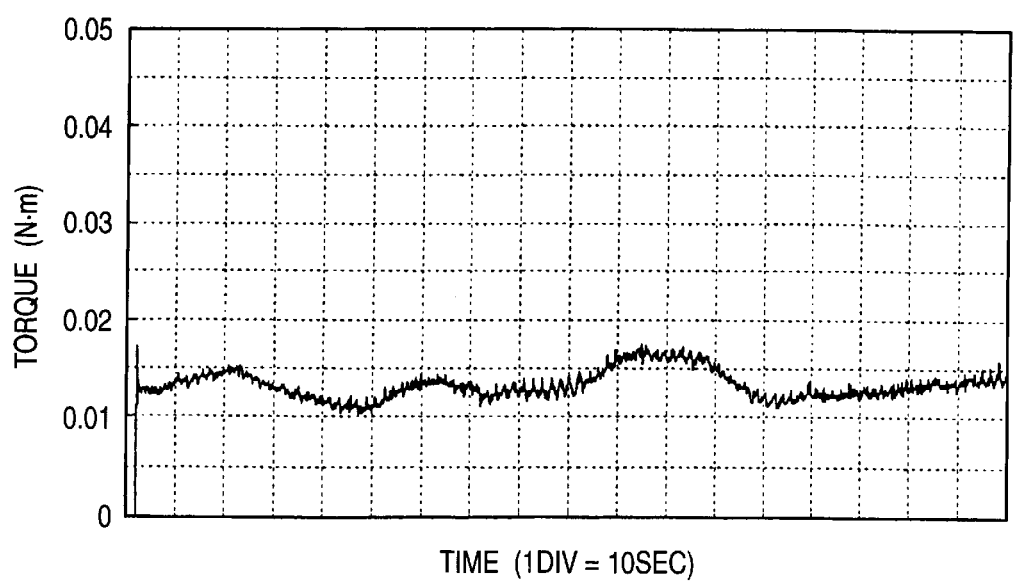
FIG. 15 is a graphical representation of variations in the torque of a ball screw according to the sixth embodiment of the invention.

FIG. 12 is a graphical representation of variations in the torque of a conventional ball screw, and FIG. 13 is a graphical representation of variations in the torque of a ball screw in which the cross section of a ball circulation tube is formed to have an oval shape having opposed straight lines. Also, FIG. 14 is a graphical representation of variations in the torque of a ball screw when spherical-shaped spacers made of resin are interposed between the mutually adjoining balls of the ball screw, and FIG. 15 is a graphical representation of variations in the torque of a ball screw according to the sixth embodiment of the invention.

As can be seen from these figures, the ball screw (first embodiment) with its ball circulation tube having the oval-shaped cross section is smaller in the torque variations than the conventional ball screw but is larger in the torque variations than the ball screw with the resin-made spherical-shaped spacers interposed between the balls. On the other hand, the ball screw according to the sixth embodiment of the invention is further smaller in the torque variations than the ball Screw with the resin-made spherical-shaped spacers interposed between the balls. The reason for this is as follows: that is, since the plurality of spacers 21 smaller in the modulus of longitudinal elasticity than the balls 15 are interposed in the ball line, the spacers 21 are elastically deformed in the arrangement direction of the balls 15 according to the packed amount of the balls (the varying quantity of balls existing within the ball circulation tube 20), so that the varying quantity of balls existing within the ball circulation tube 20 can be reduced by the spacers 21.

That is, in the ball circulation tube 20, there exist a large number of curved portions varying in the curvature thereof and thus, assuming that the balls existing within the ball circulation tube 20 are in contact with one another, due to the existence of such curved portions, the number of balls existing within the ball circulation tube 20 varies at a ball passage cycle as the balls move. This causes the balls 15 to be packed or jammed within the ball circulation tube 20. Although the packed amount of the balls at the then time is slight, because the modulus of longitudinal elasticity of steel is large, the deformation of the balls 15 due to the packed balls generates a large force and this large force is applied to the ball screw, thereby causing the torque of the ball screw to vary.

On the other hand, according to the sixth embodiment of the invention, in case where the number of balls advancing into the ball circulation tube 20 varies and a so called ball packed phenomenon is thereby caused to occur within the ball circulation tube 20, the spacers 21 are elastically deformed in the arrangement direction of the balls 15 according to the ball packed amount (the varying quantity of balls existing within the ball circulation tube 20) and thus the ball packed amount can be absorbed by the spacers 21, so that the torque variations caused by the packed phenomenon of the balls 15 can be restricted.

Also, in the above-mentioned sixth embodiment, since the spacers 21 are respectively interposed between the mutually adjoining balls 15, the balls are prevented from colliding with one another directly, which can prevent generation of noises which can be otherwise caused by the mutual collision between the balls. Further, because each of the spacers 21 is formed in a spherical shape almost identical in size with each of the balls 15, there can be prevented the possibility that the operation performance of the ball screw can be lowered.

Figure 16:
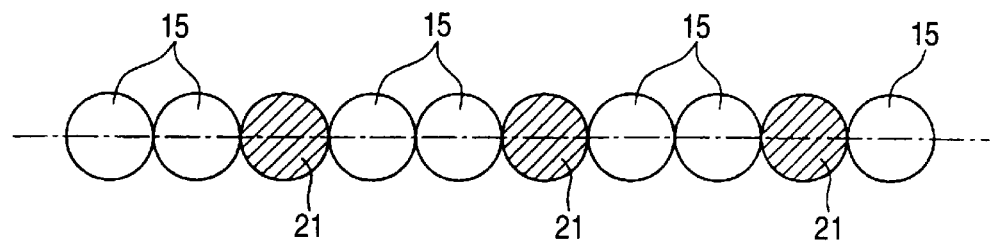
FIG. 16 is a view of a modification of a ball screw according to the sixth embodiment of the invention.

By the way, in the above-mentioned sixth embodiment, the spacers 21 smaller in the modulus of longitudinal elasticity than the balls 15 are interposed between the mutually adjoining balls, but this is not limitative. For example, as shown in FIG. 16, in the ball line formed by a large number of balls 15, there may be interposed the spacers 21 regularly in the ball line, for example, every two balls, or may be interposed irregularly in the ball line.

Figure 17:
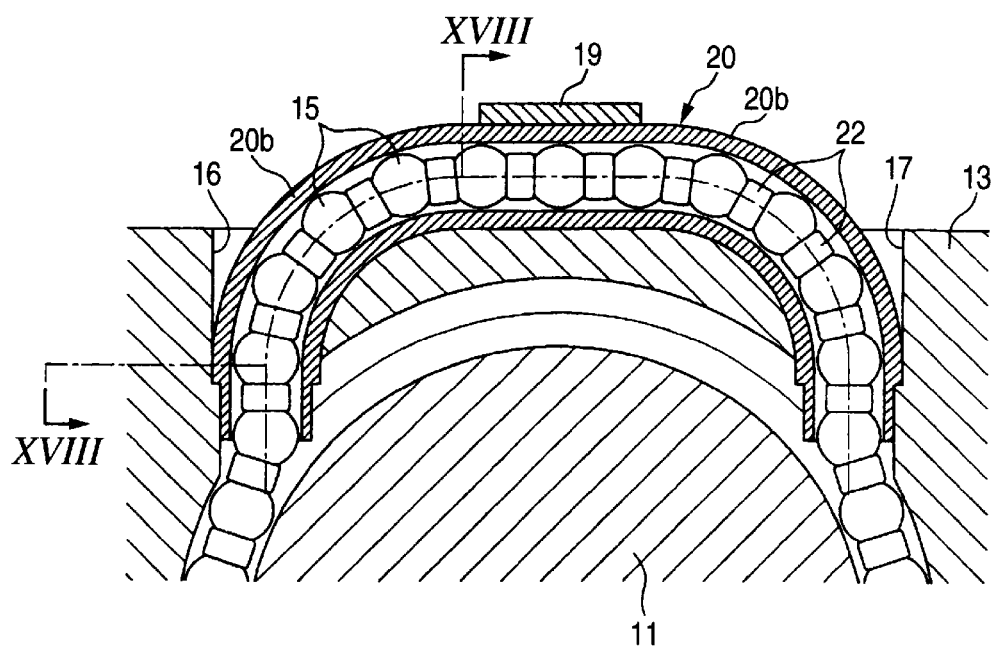
FIG. 17 is a section view of the main portions of a ball screw according to a seventh embodiment of the invention.
Figure 18:
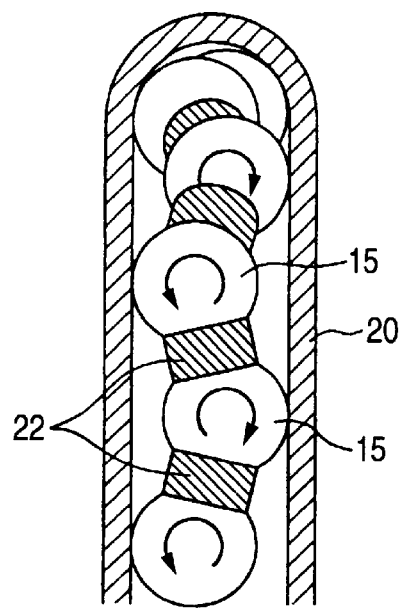
FIG. 18 is a section view taken along the arrow lines XVIII—XVIII shown in FIG. 17.
Figure 19:
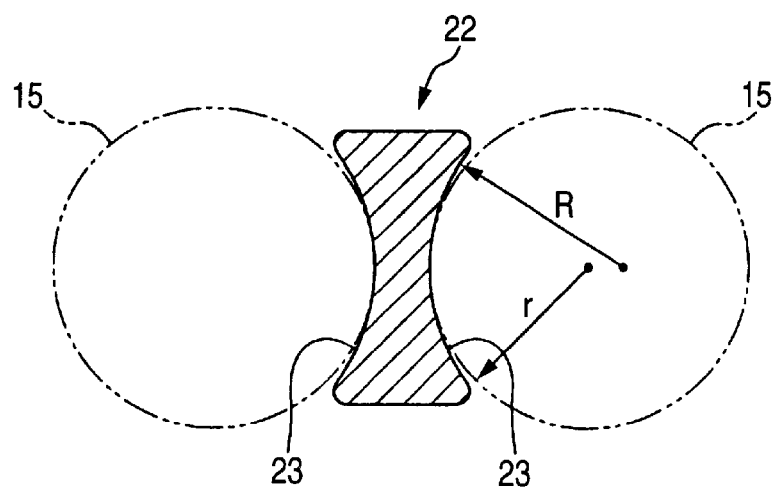
FIG. 19 is a section view of a spacer shown in FIG. 16.

Now, FIGS. 17 to 19 show a ball screw according to a seventh embodiment of the invention. Specifically, FIG. 17 is a section view of the main portions of a ball screw according to the seventh embodiment, FIG. 18 is a section view taken along the arrow lines XVIII—XVIII shown in FIG. 17, and FIG. 19 is a section view of a spacer shown in FIG. 17.

As shown in FIG. 17, a nut 13, which is used in a ball screw according to the seventh embodiment, includes two ball circulation holes 16 and 17; and, into these ball circulation holes 16 and 17, there are inserted the two end portions or a ball circulation tube 20. This ball circulation tube 20 is a tube which is used to form a circulation passage for the balls 15 in the outside of the nut 13 and is made of metal material. Also, the ball circulation tube 20 is formed in a substantially U-like shape and the cross section thereof, similarly to the above-mentioned sixth embodiment, has such a shape (for example, an oval shape having opposed straight lines) that balls 15 can be arranged within the ball circulation tube 20 in a line along the curved portions 20b thereof and in a zigzag manner with respect to the advancing direction of the balls 15.

The balls 15 are made of hard material such as steel material and, between the respective balls in a ball line which is formed by these balls 15, there are interposed spacers 22 respectively. These spacers 22 are respectively made of soft material such as synthetic resin and the modulus of longitudinal elasticity of each of the spacer 22 is set at a value smaller than the modulus of longitudinal elasticity of each of the ball 15, specifically, the modulus of longitudinal elasticity of each spacer 22 is of the order of $\frac{1}{50}-\frac{1}{500}$ of the modulus of longitudinal elasticity of each ball 15. Each of the spacers 22 is formed in a disk-like shape and has a diameter smaller than the diameter of the spacer 22 (specifically, a diameter 0.5–0.9 times the diameter of the ball). On the two end faces of each of the spacers 22, there are formed concavely spherical surfaces 23 which can be contacted with the balls 15, while each of the concavely spherical surfaces 23 has the radius of curvature R larger than the radius r of each of the balls 15. By the way, the concavely spherical surface 23 may also be structured such that its section has a Gothic-arch shape or a conical shape.

In the present structure, in case where the number of balls existing within the ball circulation tube 20 varies and a so called ball packed phenomenon is thereby to occur within the ball circulation tube 20, the spacers 22 are elastically deformed in the arrangement direction of the balls 15 according to the ball packed amount (the varying amount of the number of balls existing within the ball circulation tube 20) and the ball packed amount can be absorbed by the spacers 22, which makes it possible to control variations in the torque of the ball screw which can be otherwise caused by the packed phenomenon of the balls 15.

Also, by adjusting the thickness of the spacer 22, the distance Da' between the centers of the balls can be adjusted. Here, let us assume that, in the case of S=Da'/Da—(1) where Da: ball diameter, there is obtained $M_R=S\times n-N_R$—(2) where $N_R$: the number of balls moving into the no-load area of the ball screw under the total ball specifications and n: a natural number satisfying $0 \leq M_R \leq S$. That is, by adjusting the allowance value $M_R$ to be in the range of $0 \leq M_R \leq 0.7$, the operation of the ball screw can be enhanced further.

Also, since, due to formation of the concavely spherical surfaces 23 having a radius of curvature larger than the radius r of the ball 15 in the two end faces of the spacer 22, a lubricant such as grease can be held between the ball 15 and spacer 22, there can be formed good lubrication films not only on the contact surface between the ball 15 and screw shaft 11 but also on the contact surface between the ball 15 and nut 13, which makes it possible to enhance the durability of the ball screw.

Figure 20:
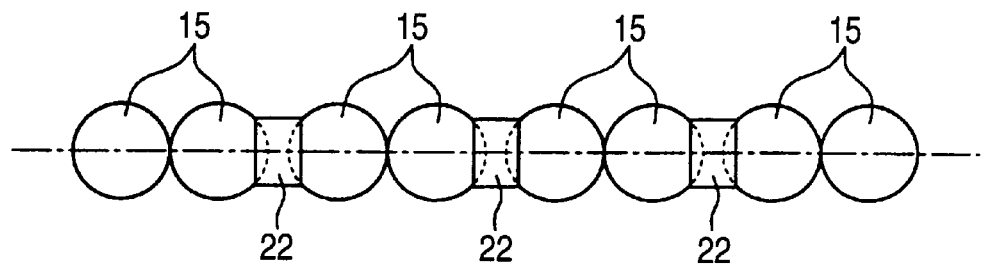
FIG. 20 is a view of a modification of a ball screw according to the seventh embodiment of the invention.

By the way, in the above-mentioned seventh embodiment, between the balls 15, there are interposed spacers 22 each having a modulus of longitudinal elasticity smaller than the modulus of longitudinal elasticity of each ball 15. However, this is not limitative but, as shown in FIG. 20, in the ball line formed by a large number of balls 15, there may be interposed the spacers 22 regularly in the ball line, for example, every two balls, or may be interposed irregularly in the ball line.

Also, in the sixth and seventh embodiments, the shape of the cross section of the ball circulation tube 20 is formed as an oval shape having opposed straight lines. However, the invention is not limited to this but, as in the embodiments respectively shown in FIGS. 5 to 8, the cross section of the ball circulation tube 20 may also be formed to have a Gothic-arc shape, a rectangular shape, a triangular shape, or a diamond-like shape. Further, in the sixth and seventh embodiments, in order to control the variations of the torque of the ball screw down to a low level, there is used a ball circulation tube 20 the cross section of which has an oval shape having opposed straight lines. However, even in case where there is used a ball circulation tube the cross section of which has a circular shape, the variations of the ball screw torque can be lowered down to a certain degree.

As has been described heretofore, in a ball screw according to the first aspect of the invention, a ball circulation tube is formed to have such a shape that the movable amount of balls in a first direction intersecting at right angles to the axis of the ball circulation tube is larger than the movable amount of the balls in a second direction intersecting at right angles to the first direction, and the ball circulation tube is fixed to a nut in such a manner that the outer surface of the present tube extending in parallel with the first direction is confronted with to the outer surface of the nut, whereby the balls can be arranged in a zigzag manner within the ball circulation tube. This makes it possible to restrict the variations in the torque of the ball screw which can be otherwise caused by the mutual sliding movements between the balls within the ball circulation tube.

Also, according to the second to seventh aspects of the invention, since the packed amount of the balls can be absorbed by the spacers, the variations in the torque of the ball screw caused by the ball packed phenomenon can be restricted further.

While there has been described in connection with the preferred embodiments of the present invention, it will be obvious to those skilled in the art that various changes and modifications may be made therein without departing from the present invention, and it is aimed, therefore, to cover in the appended claims all such changes and modifications as fall within the true spirit and scope of the present invention.

What is claimed is:

1. A ball screw comprising:

a screw shaft (11) including a first spiral groove (12) formed on an outer peripheral surface of the screw shaft;

a nut (13) disposed on the side of the outer periphery of said screw shaft and having a second spiral groove (14) formed on an inner peripheral surface of said nut in such a manner that said second spiral groove is opposed to said first spiral groove;

a plurality of balls (15) rollably held between said second spiral groove and said first spiral groove; and, a ball circulation tube (20) attached to said nut for forming a circulation passage of said balls, wherein said ball circulation tube (20) has such a cross-sectional shape that a movable amount (T+α) of said balls in a first direction (X) intersecting at right angles to an axis of said ball circulation tube is larger than a movable amount (T) of said balls in a second direction intersecting at right angles to said axis of said ball circulation tube and also at right angles to said first direction, and wherein said ball circulation tube is fixed to said nut in such a manner that an outer surface (20a) of said ball circulation tube that extends in parallel with said first direction is confronted with the outer surface of said nut.

2. The ball screw as set forth in claim 1, further comprising:

a plurality of spacers (21) disposed in a ball line defined by said balls, wherein each of said spacer has a modulus of longitudinal elasticity smaller than a modulus of longitudinal elasticity of each of said balls.

3. The ball screw as set forth in claim 2, wherein said balls are respectively made of steel, and said spacers are respectively made of resin.

4. The ball screw as set forth in claim 3, wherein said spacer is formed in a spherical shape substantially identical in size with said ball.

5. The ball screw as set forth in claim 3, wherein each of said spacers is formed in a disk-like shape having an outer diameter smaller than an outer diameter of each of said balls and also includes two concavely spherical surfaces respectively formed in the two end portions thereof that are opposed to said balls, each of said concavely spherical surfaces having a radius of curvature larger than a radius of each of said balls.

6. The ball screw as set forth in claim 3, wherein said spacers are respectively interposed between said balls.

7. The ball screw as set forth in claim 2, wherein said spacer is formed in a spherical shape substantially identical in size with said ball.

8. The ball screw as set forth in claim 2, wherein each of said spacers is formed in a disk-like shape having an outer diameter smaller than an outer diameter of each of said balls and also includes two concavely spherical surfaces respectively formed in the two end portions thereof that are opposed to said balls, each of said concavely spherical surfaces having a radius of curvature larger than a radius of each of said balls.

9. The ball screw as set forth in claim 2, wherein said spacers are respectively interposed between said balls.

* * * * *